United States Patent
Gahang

(10) Patent No.: US 6,553,151 B1
(45) Date of Patent: Apr. 22, 2003

(54) IMAGE FORMING APPARATUS FOR HALF-TONE RECORDING AND SHADING COMPENSATION AND HALF-TONE IMAGE FORMING METHOD

(75) Inventor: Goo-Soo Gahang, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 898 days.

(21) Appl. No.: 08/838,791

(22) Filed: Apr. 10, 1997

(30) Foreign Application Priority Data

Apr. 10, 1996 (KR) .............................. 96-10801

(51) Int. Cl.[7] .................................. G06K 9/40
(52) U.S. Cl. ....................... 382/274; 358/461
(58) Field of Search ............... 382/244, 270, 382/237; 358/462, 429, 456, 434, 465, 521, 522, 464, 461

(56) References Cited

U.S. PATENT DOCUMENTS

| | | | |
|---|---|---|---|
| 4,760,464 A | * 7/1988 | Sakano | 382/274 |
| 5,084,772 A | 1/1992 | Shimoyama | 358/461 |
| 5,099,341 A | 3/1992 | Nosaki et al. | 358/461 |
| 5,253,083 A | 10/1993 | Hirota | 358/461 |
| 5,278,672 A | 1/1994 | Shimazaki | 358/456 |
| 5,309,254 A | 5/1994 | Kuwabara et al. | 382/237 |
| 5,317,421 A | 5/1994 | Ito | 358/464 |
| 5,422,740 A | 6/1995 | Fujimoto et al. | 358/521 |
| 5,519,509 A | 5/1996 | Hikosaka et al. | 358/456 |
| 5,550,647 A | 8/1996 | Koike | 358/462 |
| 5,644,409 A | * 7/1997 | Irie et al. | 382/274 |
| 5,757,515 A | * 5/1998 | Okada | 382/274 |

FOREIGN PATENT DOCUMENTS

| | | |
|---|---|---|
| EP | 0024470 | 11/1981 |
| EP | 0200438 | 5/1986 |
| GB | 2292293 | 2/1996 |

* cited by examiner

Primary Examiner—Samir Ahmed
(74) Attorney, Agent, or Firm—Robert E. Bushnell, Esq.

(57) ABSTRACT

An image forming apparatus with an image sensor for scanning a document to produce an electric signal; a converter for converting the electric signal into image data with a predetermined number of bits, m; a shading memory for storing output image data, scanned during a first mode operation with the converter, pixel by pixel, and also storing shading factors each corresponding to each pixel of the image data; a controller for reading the image data stored in the least significant address to the most significant address of the shading memory during the first mode of operation, finding shading factors for each pixel by dividing a preset maximum brightness value, M, by each of the sequentially read image data, then storing the shading factors in the shading memory, and for outputting the shading factors stored in the shading memory corresponding to each pixel of image data produced by the converter during a second mode of operation; a shading compensating circuit to multiply, pixel by pixel, the shading factors of the controller by the image data from the converter during the second mode of operation, to produce shading-compensated image data; and a half-tone processing circuit for producing a half-tone image from the output of the shading compensating circuit.

10 Claims, 2 Drawing Sheets

IMAGE FORMING APPARATUS FOR HALF-TONE RECORDING AND SHADING COMPENSATION AND HALF-TONE IMAGE FORMING METHOD

CLAIM FOR PRIORITY

This application makes reference to, incorporates the same herein, and claims all benefits accruing under 35 U.S.C. §119 from an application for Image Forming Apparatus For Half-Tone Recording And Shading Compensation And Half-Tone Image Forming Method earlier filed in the Korean Industrial Property Office on Apr. 10, 1996 and there duly assigned Serial No. 1080/1996.

BACKGROUND OF THE INVENTION

1. Technical Field

The present invention generally relates to an image forming apparatus, and more particularly, relates to an image forming apparatus with an improved construction that simplifies shading compensation and half-tone recording. The present invention also relates to a half-tone image forming method.

2. Related Art

Image forming apparatuses such as digital photocopiers, facsimile machines and laser printers are systems in which graphic material in the form of an original copy is scanned and converted to an electrical signal to be reproduced on a recording medium. An image forming apparatus generally produces a half-tone image by scanning a document with a light source. An analog image signal, produced during the document scanning, is converted into a digital signal by an analog-to-digital converter (ADC). A reference voltage used in the ADC is fixed without consideration of respective output characteristics of image sensors. As a result, printed image with different half-tone may be reproduced, and at worst the gradation of the image becomes unclear.

One example of a half-tone image reproduction technique that seeks to reproduce a half-tone image with a proper density is disclosed in Korea Patent Application No. 93-5325 for Image Signal Processing Apparatus For Half-Tone Recording And Method Of Controlling The Image Signal Processing Apparatus assigned to the same assignee of the instant application. In this disclosure, a maximum amplitude of an image signal, produced by an image sensor during half-tone recording, is determined, and 90% to 95% of this maximum image signal (voltage) serves as a reference voltage (+Vref) in order to determine a dynamic range of the analog-to-digital converter ADC. This technique, however, requires the ability to control the reference voltage and incorporates a digital-to-analog converter DAC to convert a digital signal back to the corresponding analog signal. By eliminating the DAC, the image forming apparatus for half-tone recording could be simplified. Other half-tone image reproduction techniques are disclosed, for example, in U.S. Pat. No. 5,278,672 for Image Signal Processing Apparatus issued to Shimazaki, U.S. Pat. No. 5,309,254 for Image Processing Apparatus Capable Of Processing Half-Tone Image Data issued to Kuwabara et al., U.S. Pat. No. 5,519,509 for Image Processing Method Utilizing Error Diffusion Technique issued to Hikosaka et al., and U.S. Pat. No. 5,550,647 for Image Processing Apparatus For Converting A Multilevel Image Signal Into A Bi-Level Image Signal issued to Koike.

Conventional image forming apparatus also includes a shading correction system for compensating shading distortions due to differences in sensitivity between image sensing elements of an image sensor, light intensity distribution of the light source irradiating the document, and distortion of lens or the like in an optical system. Examples of shading correction system are disclosed in U.S. Pat. No. 5,084,772 for Shading Correction Method In Image Reading Device issued to Shimoyama, U.S. Pat. No. 5,099,341 for Image Reading Apparatus With Improved Shading Correction issued to Nosaki et al., U.S. Pat. No. 5,253,083 for Image Reading Apparatus Having Improved Shading Correction issued to Hirota, U.S. Pat. No. 5,317,421 for White Reference Data Generating Unit Applied To Shading Correction System issued to Ito, and U.S. Pat. No. 5,422,740 for Image Forming Apparatus Which Effects Output Gray Level Correction issued to Fujimoto et al. Generally, in order to compensate for shading distortions, a shading factor for every scanned pixel is assessed during a dummy scanning operation. Shading distortions are compensated by multiplying each pixel converted into a digital signal during a real scanning operation by respective shading factors. For shading compensation, the conventional technique requires the step of finding a maximum brightness value among the dummy-scanned pixels. If this step can be avoided, as I have observed however, the shading compensation will be less complicated and will require less time to complete.

SUMMARY OF THE INVENTION

Accordingly, it is therefore an object of the present invention to provide an improved image forming apparatus and process of half-tone recording and shading compensation of an image.

It is also an object to provide an image forming apparatus with a simplified construction for performing both the half-tone recording and shading compensation of an image.

It is another object to provide a method of simplifying the construction of an image forming apparatus and its operational processes required for half-tone recording and shading compensation of an image.

It is still another object to provide an image forming apparatus and process for performing the half-tone recording and shading compensation faster than possible with the present art.

These and other objects of the present invention can be achieved by an image forming apparatus with an image sensor for scanning a document to produce an electric signal representative of an image from the document which includes a converter for converting the electric signal to produce image data with a predetermined number of bits; a shading memory unit for storing said image data on a pixel by pixel basis from a least significant address to a most significant address scanned during a first mode operation, and for storing shading factors each corresponding to each pixel from the image data; a controller for sequentially reading said image data stored from the least significant address to the most significant address of the shading memory unit during the first mode of operation, calculating each shading factor for each pixel by dividing a preset maximum brightness value by the image data sequentially read from the shading memory unit, recording the shading factors in the shading memory unit, and for outputting the shading factors stored in the shading memory unit corresponding to each pixel of the image data produced by the converter during a second mode of operation; a shading compensation unit for multiplying each pixel of the image data produced from the converter by a corresponding one of the shading factors during said second mode of operation to produce shading-compensated image data; and a half-tone processing unit for producing a half-tone image from the shading-compensated image data produced from the shading compensating unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
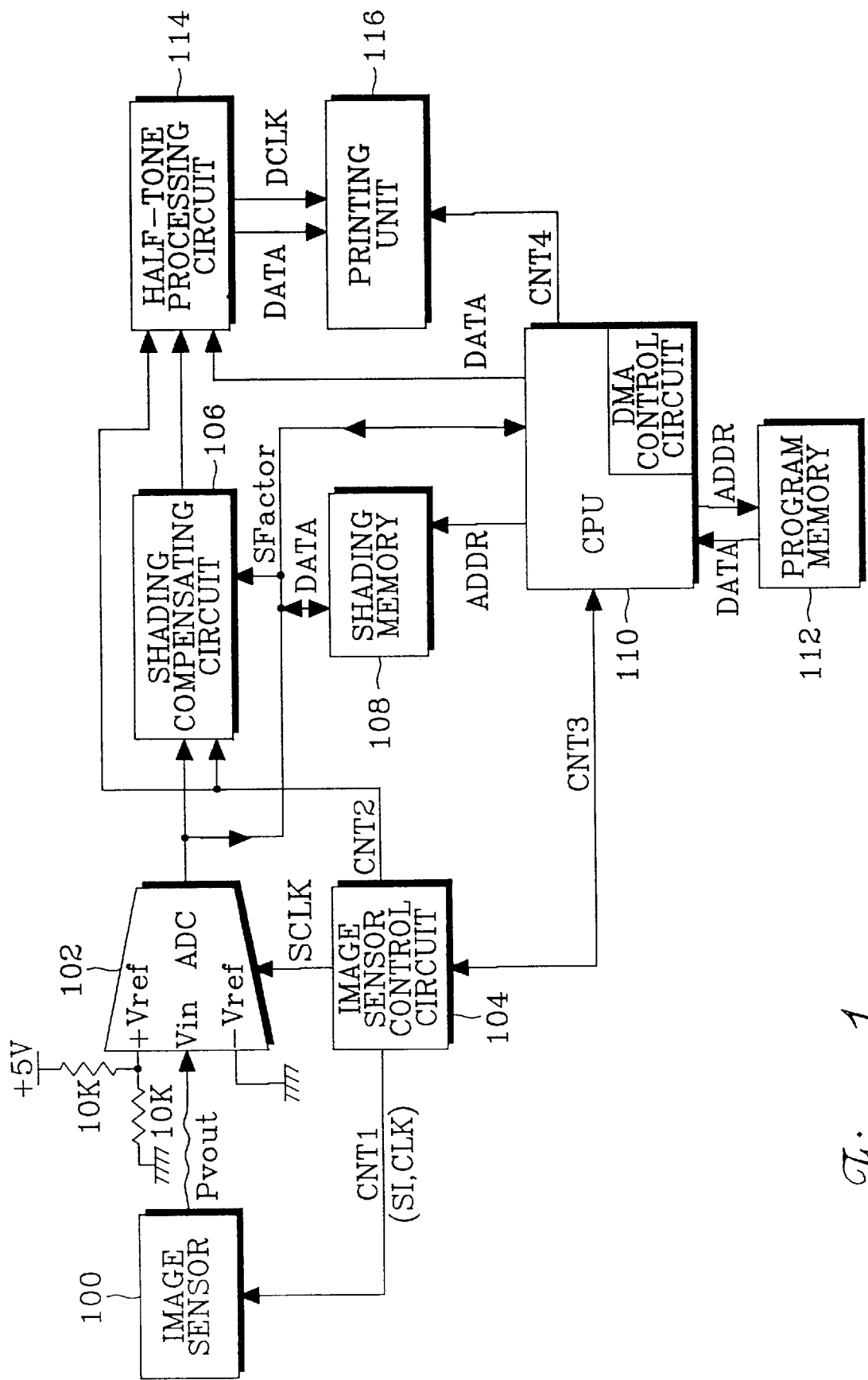
FIG. 1 is a block diagram of an image forming apparatus constructed according to the principles of the present invention.

Referring now to the drawings and particularly to FIG. 1, which illustrates an image forming apparatus with a simplified construction for performing both half-tone recording and shading compensation according to the principles of the present invention. As shown in FIG. 1, the image forming apparatus includes an image sensor 100 such as a CCD image sensor disposed in a main scanning direction for scanning a document and then generating an electric signal Pvout representative of an image from the document. An analog-to-digital converter (ADC) 102 then converts the electric signal Pvout from the image sensor 100 into digital image data having a dynamic range determined by reference voltages +Vref and −Vref.

The image forming apparatus also includes a shading memory 108, which is controlled by a central processing unit (CPU) 110, for purposes of storing the image data of ADC 102 according to addresses for each pixel during dummy scanning, and the shading factors SFactor that are generated for each pixel. A shading compensating circuit 106, that multiplies the image data, obtained during a real scanning operation under control of the CPU 110, by shading factors SFactor, which were stored in shading memory 108, to thereby produce shading-compensated image data. A half-tone processing circuit 114, which generates a halftone from the real-scanned imagedata and the output of shading compensating circuit 106. A printing unit 116, which prints the image processed by half-tone processing circuit 114.

Image sensor 100 scans the document in response to a first control signal CNT1 (line synchronizing signal SI, synchronizing clock CLK), that is generated by an image sensor control circuit 104. ADC 102 converts the electric signal Pvout to m-bit digital image data, determined by a sampling clock SCLK produced by the image sensor control circuit 104. Shading compensation circuit 106 and half-tone processing circuit 114, perform the shading compensation and the half-tone recording processes respectively, in response to a second control signal CNT2 which is output by image sensor control circuit 104.

The CPU 110 controls the dummy scanning and real scanning operations according to a program stored in program memory 112. The CPU 110 contains therein a direct memory access (DMS) control circuit, which directly accesses the image data from ADC 102, generated during dummy scanning, and stores the same in the shading memory 108. The CPU 110 applies to the shading compensating circuit 106, the shading factors SFactors corresponding to each pixel that were stored in shading memory 108 during the real scanning operation, and inputs the inverse values to the half-tone processing circuit 114, so as to produce a half-tone image. The CPU 110 generates a fourth control signal CNT4 for printing unit 116 using information from half-tone processing circuit 114.

Figure 2:
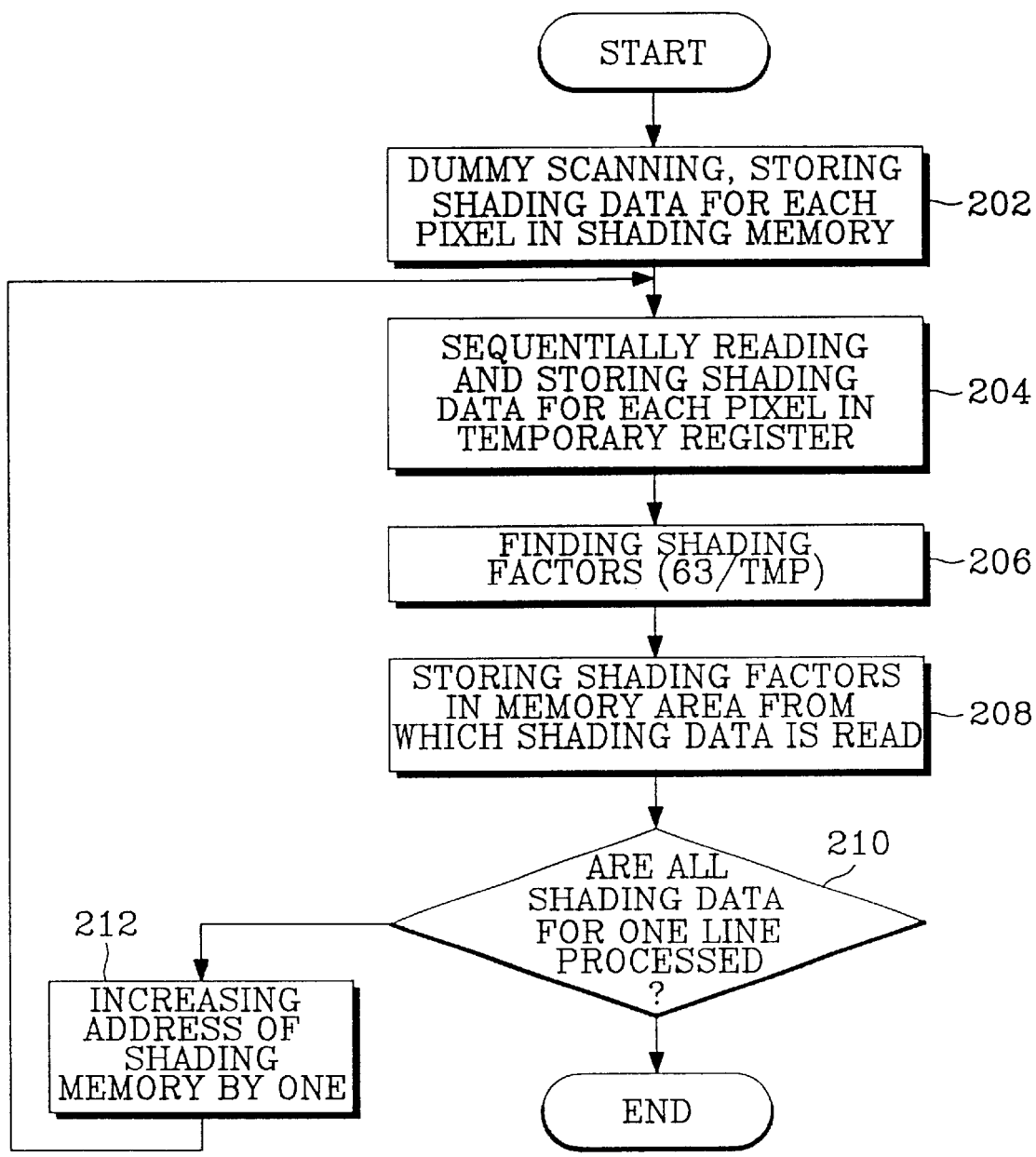
FIG. 2 is a flow chart of a control sequence of an image forming apparatus constructed according to the principles of the present invention.

Turning now to FIG. 2, which illustrates a control sequence of an image forming apparatus in which a dummy scanning of the document will be fully described as follows.

First, the CPU 110 generates a third control signal CNT3 for the image sensor control circuit 104 to start dummy scanning, and controls the DMA control circuit, so that output image data from ADC 102 is stored, as shading data, by pixel from the least significant address to the most significant address of shading memory 108 at step 202. During the dummy scanning mode, the image sensor 100 scans a white panel or white roller mounted opposite the image sensor. Once the dummy scanning is completed, the CPU 110 sequentially reads and store the shading data stored in the least significant address of the shading memory 108 in a temporary register (TMP) of the shading memory 108 at step S204. The CPU 110 then finds a shading factor for shading data previously stored in TMP by dividing a preset maximum brightness value by a value of the shading data previously stored in TMP at step S206, and stores the shading factor in the least significant address of the shading memory 108, where the shading data was originally read from at step S208.

After that, the CPU 110 increases address of the shading memory 108 one by one at step S212 and repeats steps 204 to S206. The CPU 110 then finds the shading factor for shading data stored in the address field at step 206, and returns to step 208 to store the shading factor in the corresponding address of shading memory 108. The CPU 110 repeats the above operation until all shading factors for the pixels which constitute a complete line of the image have been determined, i.e. shading data for one line are all processed at step S210:

Following the above operation, the shading factors for one line of image data are stored in the shading memory 108. The CPU 110 controls the image sensor control circuit 104 to perform the real scanning operation, and image data from ADC 102 is input to the shading compensating circuit 106. The CPU 110 reads successive shading factors SFactor stored in the least significant address to the most significant address of the shading memory 108, and applies the same to shading compensating circuit 106. The shading compensating circuit 106 multiplies the value of the image data from ADC 102, by the corresponding shading factor in the shading memory 108, to produce shading-compensated image data. The half-tone processing circuit 114 produces a half-tone image using output image data from shading compensating circuit 106, and an inverse value provided by the CPU 110. Printing unit 116 prints the half-tone image on a recording medium.

If the ADC 102 converts an analog image signal Pvout received from the image sensor 100 into digital image data in the form of 6-bit pixels, the image sensor control circuit 104 applies a 6-bit sampling clock, SCLK, to ADC 102 under the control of the CPU 110. The CPU 110 sets the maximum brightness value to $63_{10}(2^6-1)$ in order to determine shading factors for each pixel, and sends series of inverse values such as 2, 6, 10, 14, 16, ..., 54, 58, 62 to the half-tone processing circuit 114.

The inventive image forming apparatus does require a digital-to-analog converter, which can be a simple and inexpensive circuit, to provide a reference voltage for the ADC. The present invention determines shading factors for each pixel by dividing a preset maximum brightness value by each pixel value stored in the shading memory, and thus reduces the time required to perform the shading compensation operation. That is, contrary to the conventional image forming apparatus in which the CPU must read the image data stored in its shading memory one pixel at a time in order to find the maximum brightness value, and must then re-read the image data stored in the shading memory in order to calculate a shading factor for each pixel, the CPU of the inventive image forming apparatus constructed according to the present invention finds a shading factor for each pixel by dividing the preset maximum brightness value by the pixel value stored in the shading memory during a dummy scanning, which reduces the time required to perform the shading compensation.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An image forming apparatus with an image sensor for scanning a document to produce an electric signal representative of an image from the document, comprising:

a converter for converting said electric signal to produce image data with a predetermined number of bits;

a shading memory unit for storing said image data on a pixel by pixel basis from a least significant address to a most significant address scanned during a first mode operation with said converter, and for storing shading factors each corresponding to each pixel from said image data;

a controller for sequentially reading said image data stored from the least significant address to the most significant address of said shading memory unit during said first mode of operation, calculating each shading factor for each pixel by dividing a preset maximum brightness value by said image data sequentially read from said shading memory unit, recording the shading factors in said shading memory unit, and for outputting the shading factors stored in said shading memory unit corresponding to each pixel of said image data produced by said converter during a second mode of operation;

a shading compensation unit for multiplying each pixel of said image data produced from said converter by a corresponding one of said shading factors during said second mode of operation to produce shading-compensated image data; and a half-tone processing unit for producing a half-tone image data from said shading-compensated image data produced from said shading compensating unit.

2. The image forming apparatus of claim 1, wherein a relationship between the predetermined number of bits that are used to define each pixel in said image data produced from said converter and the preset maximum brightness value is expressed by the following equation: $M=2^m-1$, where M represents the preset maximum brightness value and m represents the predetermined number of bits.

3. The image forming apparatus of claim 1, further comprising a printing unit for printing said half-tone image data produced by said half-tone processing unit on a recording medium.

4. The image forming apparatus of claim 1, further comprised of said half-tone processing unit generating said half-tone image data based upon said shading-compensated image data produced from said shading compensating unit and predetermined inversed values.

5. An image forming apparatus with an image sensor for scanning a document to produce an electric signal representative of an image from the document, comprising:

a converter for converting said electric signal to produce image data with a predetermined number of bits;

a shading memory unit for storing the image data obtained during a dummy scanning mode, and for storing shading factors corresponding to each pixel of the image data;

a first control unit for sequentially reading the image data stored from a least significant address to a most significant address in said shading memory unit during the dummy scanning mode, and finding a shading fact for each pixel by dividing a preset maximum brightness value by said image data sequentially read from said shading memory unit, and for storing the shading factors in said shading memory unit;

a second control unit for outputting the shading factors stored in said shading memory unit by address in a real scanning mode, and for outputting inverse values corresponding to a value of the predetermined bits;

a shading compensating unit to multiply, pixel by pixel, the shading factors of said second control unit, by the image data obtained from said converter during the real scanning mode to produce shading-compensated image data; and a half-tone processing unit for generating a half-tone image from the image data, using the shading-compensated image data of said shading compensating unit and the inverse values.

6. The image forming apparatus of claim 5, wherein a relationship between the predetermined number of bits that are used to define each pixel in said image data produced from said converter and the preset maximum brightness value is expressed by the following equation: $M=2^m-1$, where M represents the preset maximum brightness value and m represents the predetermined number of bits.

7. The image forming apparatus of claim 5, further comprising a printing unit for printing said half-tone image data produced by said half-tone processing unit on a recording medium.

8. A half-tone image forming method for an image forming apparatus with an image sensor for scanning a document to produce an electric signal representative of an image from the document, comprising the steps of:

converting said electric signal into image data having a predetermined number of bits, m;

reading the image data, pixel by pixel, obtained during a dummy scanning mode, then finding a shading factor for each pixel by dividing a preset maximum brightness value by said image data, and for storing resulting shading factors of the image data in a memory;

multiplying, pixel by pixel, said shading factors, by said image data obtained during a real scanning mode to produce shading-compensated image data; and obtaining a half-tone image of the dummy-scanned image data from said shading-compensated image data.

9. The half-tone image forming method of claim 8, wherein a relationship between the predetermined number of bits that are used to define each pixel in said image data and the preset maximum brightness value is expressed by the following equation: $M=2^m-1$, where M represents the preset maximum brightness value and m represents the predetermined number of bits.

10. The half-tone image forming method of claim 8, further printing said half-tone image on a recording medium.

* * * * *